United States Patent [19]

Joice

[11] 4,275,977

[45] Jun. 30, 1981

[54] APPARATUS AND METHOD FOR INDIVIDUAL BAG WORKING AND STACKING

[76] Inventor: Richard L. Joice, 20021 Merridy St., Chatsworth, Calif. 91311

[21] Appl. No.: 47,275

[22] Filed: Jun. 11, 1979

[51] Int. Cl.³ .................. B65G 57/04; B65H 29/32
[52] U.S. Cl. .................. 414/51; 198/689; 271/180; 271/197; 414/69; 414/73; 414/786
[58] Field of Search .................. 414/27, 69, 72, 73, 414/76, 77, 786, 907, 900, 51; 271/177, 180, 197, 276; 198/689

[56] References Cited

U.S. PATENT DOCUMENTS

| | | | |
|---|---|---|---|
| 2,813,637 | 11/1957 | Perry et al. | 271/197 X |
| 3,064,827 | 11/1962 | Bostock et al. | 198/597 X |
| 3,328,027 | 6/1967 | Schmidtke | 271/197 |
| 3,395,915 | 8/1968 | Clausen et al. | 414/73 X |
| 3,659,840 | 5/1972 | Ruck | 271/197 X |
| 3,698,708 | 10/1972 | Brawn | 414/73 X |
| 3,820,779 | 6/1974 | Bishop | 271/180 |
| 3,988,019 | 10/1976 | Achelpohl | 271/180 |

FOREIGN PATENT DOCUMENTS 969938 7/1958 Fed. Rep. of Germany ............ 414/73

*Primary Examiner*—Leslie J. Paperner
*Attorney, Agent, or Firm*—Allan M. Shapiro

[57] ABSTRACT

The apparatus comprises a vacuum conveyor which periodically receives a polymer film bag from a bag-making machine and intermittently advances the bag to a work station. If work is to be performed at that work station, the vacuum is cut off and the bag is operated upon. At the work station, the bag may be printed, cut, stacked, wicketed, provided with handles, provided with a sealed-in drawstring, or delivered to a second conveyor. The apparatus may include one or more work stations, and the method comprises advancing the bag to the selected work station, turning off the vacuum at that work station to aid in the bag delivery, and working on the bag.

12 Claims, 8 Drawing Figures

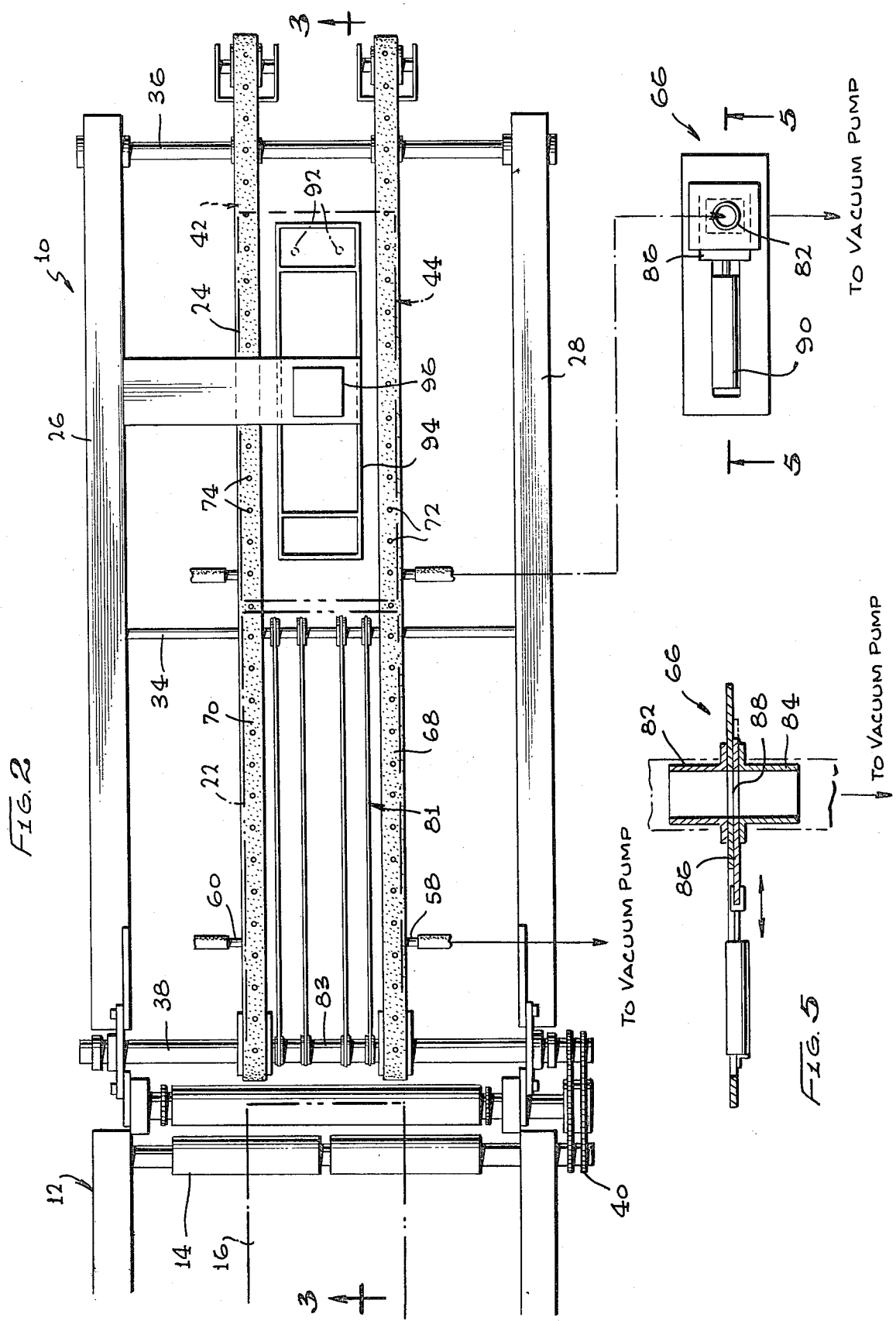

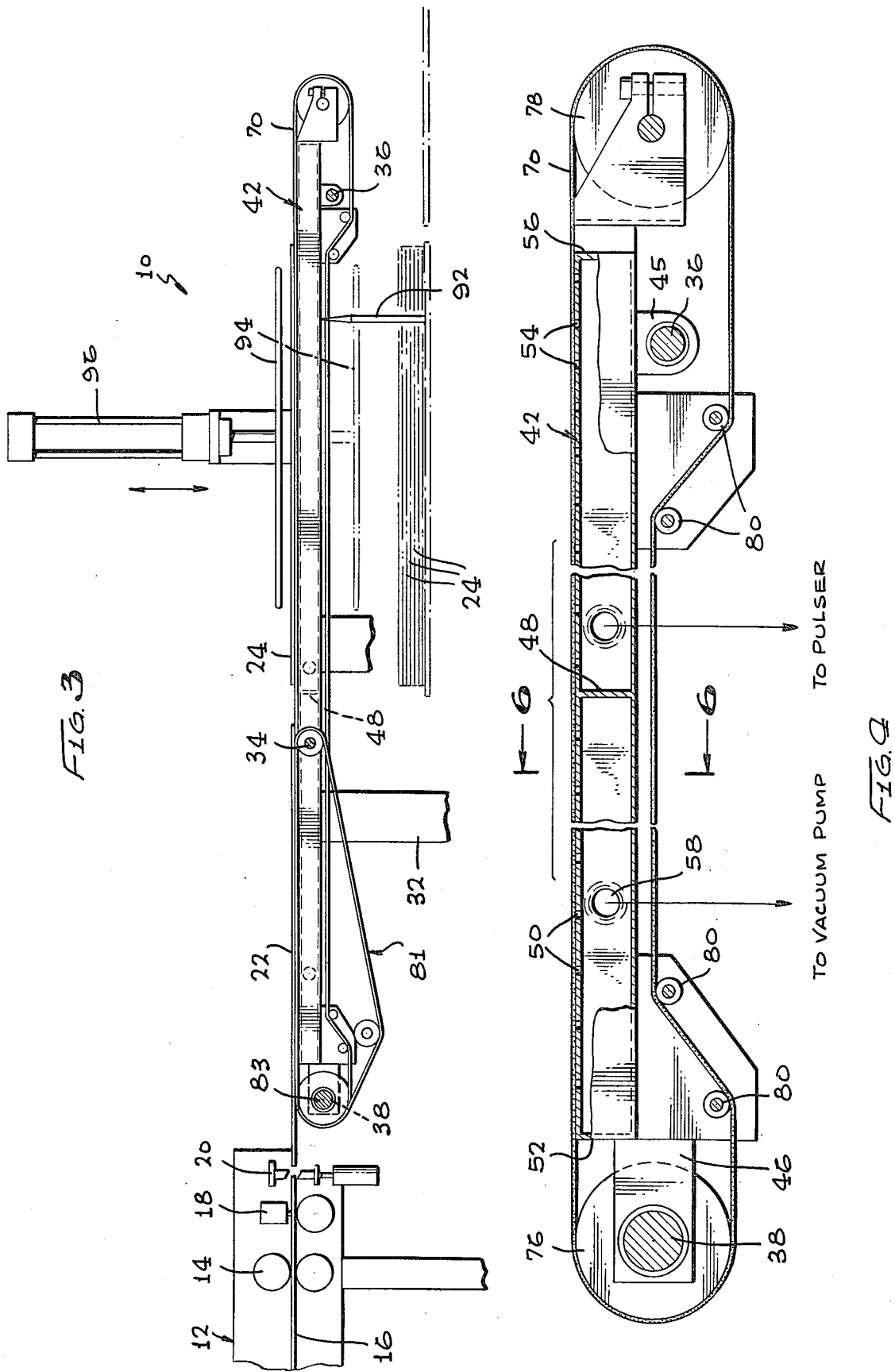

APPARATUS AND METHOD FOR INDIVIDUAL BAG WORKING AND STACKING

BACKGROUND OF THE INVENTION

1. Field of the Invention

This invention is directed to polymer film bag-handling apparatus, and particularly a vacuum conveyor which can advance the bag to a work station and release the bag at the work station for further bag operations or handling.

2. Description of the Prior Art

Common bag-making machines are supplied with polymer film which is then folded, sealed, and/or cut to provide a bag of the desired size and shape. Such bag-making machines act continually on the polymer film and intermittently deliver bags. These bags are usually stored until the next operation, which may be bag-filling and sealing. Often, the storage is on wickets so that a wicketer receives the cut bags from the bag-making machine.

It is desirable to be able to conveniently handle the bags as they are continually delivered from the bag-making machine. While the bag may be complete as delivered from the bag-making machine, in the sense that it is in the form of two layers sealed around three edges, further operations may be desirable, and it is thus desirable to be able to transfer the bags from the bag-making machine to post-processing position and equipment.

SUMMARY OF THE INVENTION

In order to aid in the understanding of this invention, it can be stated essentially summary form that it is directed to an apparatus and method for individual bag-working and stacking. The apparatus consists of an intermittently advanced conveyor which is continually driven in coordination with a bag-making machine so that it is advanced as a bag is delivered to it by the bag-making machine. The conveyor is a vacuum conveyor having a first section or station carrying continuous vacuum and a second section with a work station where the vacuum is selectively applied. If a bag advanced to the work station is to be acted upon at that station, the vacuum is turned off at that station so that the bag can be removed and acted upon. The method consists of the steps of bag receipt, advance and selective discharge at a work station.

It is thus an object of this invention to provide an apparatus and method for individual bag-working and stacking wherein the apparatus receives bags as they are delivered from a bag-making machine so that the apparatus can advance the bags to a selected work station. It is another object to provide an apparatus which includes a vacuum conveyor having a first section of continuous vacuum and a second section of selectively non-vacuum at a work station so that a bag can be removed at a selected work station. It is a further object to provide an apparatus and method wherein the vacuum is controlled at the work station along a vacuum conveyor so that a polymer film bag may be advanced to the desired station location and then removed from the conveyor through the termination of vacuum at that station of the conveyor.

Other features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 2 is an enlarged plan view thereof.

FIG. 3 is a vertical section taken generally along the line 3—3 of FIG. 2.

FIG. 4 is an enlarged side-elevational view, with parts broken away to shorten the length thereof, and parts broken away to show sections thereof, of the vacuum conveyor portion of the apparatus of this invention.

FIG. 5 is an enlarged section through the vacuum control valve, taken generally along the line 5—5 of FIG. 2.

DESCRIPTION OF THE PREFERRED EMBODIMENTS

Figure 1:
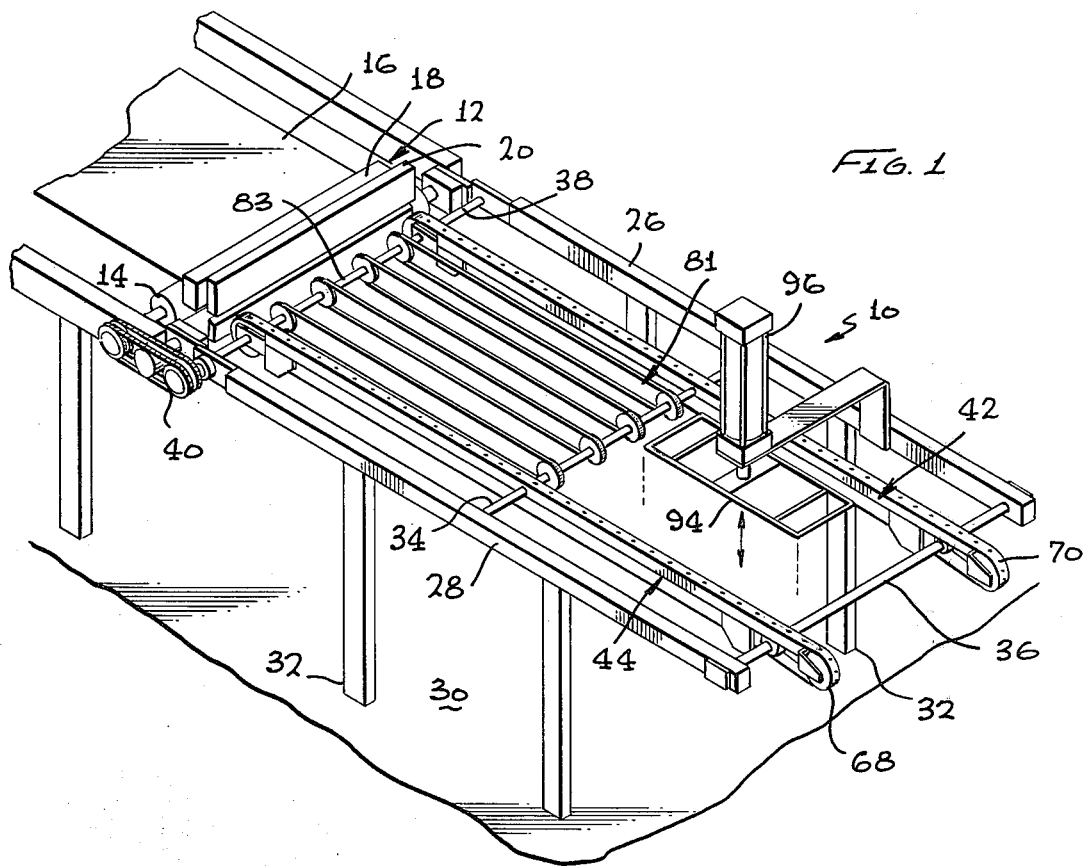
FIG. 1 is an isometric view of the first preferred embodiment of the apparatus for individual bag-working and stacking in accordance with this invention and for performing the method.

The first preferred embodiment of the apparatus in accordance with this invention for individual bag-working and stacking is generally indicated at 10 in FIGS. 1, 2 and 3. At the input end of the apparatus 10, there is a conventional polymer film bag-making machine 12. The bag-making machine 12 has an input of a film of thermoplastic synthetic polymer composition material. The material is folded and heat-sealed and sometimes cut along the edges as it moves forward through bag-making machine 12. Rollers 14 advance polymer film 16 toward the output end of bag-making machine 12. At the output end, seal bar 18 closes the bottom of the bag, and cutter 20 cuts off the film to provide discrete bags. A bag furnished by bag-making machine 12 and delivered therefrom is indicated as bag 22 on apparatus 10. Bag-making machine 12 operates continually, with the filmfeed stopping for each actuation of seal bar 18 and cutter 20. After these functions are performed, rollers 14 again move the film forward to the new seal and cutoff position. A series of bags is thus delivered from the machine to apparatus 10. Bags 22 and 24 are illustrated as being positioned on the apparatus 10.

Apparatus 10, see FIGS. 1 and 2, has side rails 26 and 28 which are supported from floor 30 by means of legs 32. The side rails together with the legs and cross bars 34 and 36 form the frame of apparatus 10. Cross shaft 38 is rotatably mounted in side rails 26 and 28. As is seen in FIGS. 1 and 2, cross shaft 38 is driven by chain 40 from the final film-advancing roller 14 of bag-making machine 12. Therefore, shaft 38 rotates when a new bag is advanced out of the bag-making machine.

Figure 6:
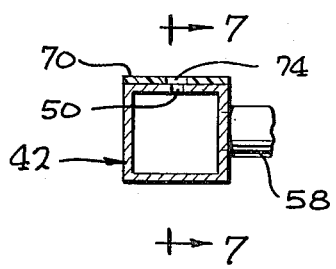
FIG. 6 is a section through the vacuum conveyor rail, taken generally along the line 6—6 of FIG. 4.
Figure 7:
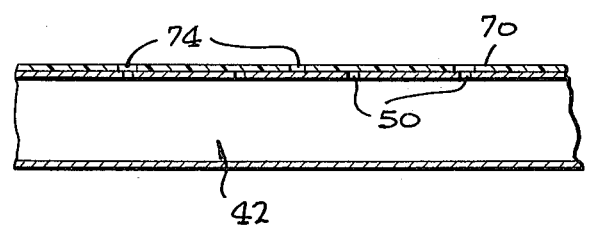
FIG. 7 is a longitudinal section through a portion of the vacuum conveyor rail, taken generally along the line 7—7 of FIG. 6.

Vacuum conveyor rails 42 and 44 are mounted on cross bars 34 and 36 and on cross shaft 38. They are arranged so that the width therebetween can be adjusted and locked. As is seen in FIG. 4, vacuum conveyor rail 42 has a flange 45 extending therebelow and embracing cross bar 36 as well as flange 46 extending from its input end and embracing cross shaft 38. As is seen in FIGS. 4, 6 and 7, vacuum conveyor rail 42 is in the form of a square tube. Rail 44 is identical. Rail 42 and its companion rail 44 are each divided into two sections by divider 48, see FIGS. 3 and 4. Vacuum openings 50 are formed in the top of the first section of vacuum conveyor rail 42, between its front end 52 and divider 48. Similar vacuum openings 54 are formed in the top of the second section of vacuum conveyor rail between divider 48 and its back end 56. Similar openings and a similar divider are provided for vacuum conveyor rail 44 so that it also is divided into a first and a second section. Vacuum connection 58 is connected to the first section of vacuum conveyor rail 42, and a similar vacuum connection 60 is connected to the first section of vacuum conveyor rail 44. Both of these vacuum connections are directly connected to a vacuum pump or other continuous vacuum source. Vacuum connection 62 is provided to the interior of the second section of vacuum conveyor 42, while vacuum connection 64 is connected to the second section of vacuum conveyor rail 44. Both these vacuum connections are connected together, and they are connected through vacuum valve 66 to the vacuum pump.

Conveyor belts 68 and 70 respectively pass over the tops of vacuum conveyor rails 42 and 44. The conveyor belts respectively have vacuum openings 72 and 74 therein. Vacuum openings 72 and 74 are so positioned in their conveyor belts so that, as the conveyor belts advance, the vacuum openings in the vacuum conveyor rails and in the conveyor belts become aligned so that vacuum is applied to any material lying on top of the belts. As is best seen in FIG. 4, belt 70 passes around drive pulley 76 which is mounted on cross shaft 38 to be driven thereby, and then the belt 70 passes across the first and second sections of conveyor rail 42. At the rear of the vacuum conveyor rail, belt 70 passes around idler pulley 78 and thence around a series of guide rollers 80 back to drive pulley 76. A similar arrangement is provided for conveyor belt 68.

Since cross shaft 38 is driven from bag-making machine 12 and drive pulley 76 is driven by shaft 38, then the vacuum conveyor belts both advance when the bag-making machine is feeding out a finished bag, and the conveyor belts stop when the bag-making machine stops for sealing and cutting of the film. Rope conveyors 81 extend around rope pulleys on the shaft 34 and on shaft 83, see FIG. 3, to aid in starting the bags from the bag-making machine outlet onto the front end of the vacuum conveyor. The first section of the vacuum conveyor rail becomes a first station, and the second section becomes a second station. These stations are arranged in length and drive chain 40 is arranged so that the bags 16, 22 and 24 are advanced from station-to-station upon repetitive operational sequence of the bag-making machine. Since the vacuum applied to the first section at the first station of rails 42 and 44 is constant, the bag remains attached to the vacuum conveyor. However, the vacuum at the second station can be cut off by vacuum valve 66 to permit the release of the bag at that station, if desired. The vacuum valve 66 is shown in more detail in FIG. 5. Its inlet connection 82 is connected to vacuum connections 62 and 64 at the second station. Its outlet 84 is connected to the vacuum pump. Gate 86 is slidably mounted and has openings 88 therethrough which can be aligned with the inlet and outlet connections 82 and 84 and can be slid to a closed position where the gate is blank to prevent interconnection between the inlet and outlet. Sliding of the gate is accomplished by motor 90 which is in the form of an air cylinder. The motor 90 is actuated to deliver vacuum to the second station when retention of the bag at the second station is desired and to release vacuum when release of the bag at the second station is desired.

In the first preferred embodiment, as an example of the further bag working which can be accomplished at a work station, wickets 92 (see FIG. 3) are positioned beneath the second station to receive bags from the second station. The wickets engage in wicketing holes already formed at the top edge of the bags. Wickets 92 are located at a position that the wicketing holes in the bags are positioned over the wickets when the bags are stopped at the second station. Thereupon, vacuum is released so that the bags can be wicketed. In order to aid wicketing, plunger 94, actuated by cylinder 96, is actuated when the vacuum is released to press the bag down onto the wickets and the wicketed stack of bags. This use of a plunger increases operating speed by positively positioning the bag onto the wickets, and not waiting for the action of gravity to accomplish that result. Vacuum valve 66 and plunger 94 are coordinated with the cyclical advance of the vacuum conveyor. When the conveyor has moved a bag from the first to the second station and the bag and belt are stationary, then the vacuum is turned off and the plunger actuated when it is desired to wicket the bag. These controls can be managed by a cam or a switch operated in conjunction with the cyclic advance.

Figure 8:
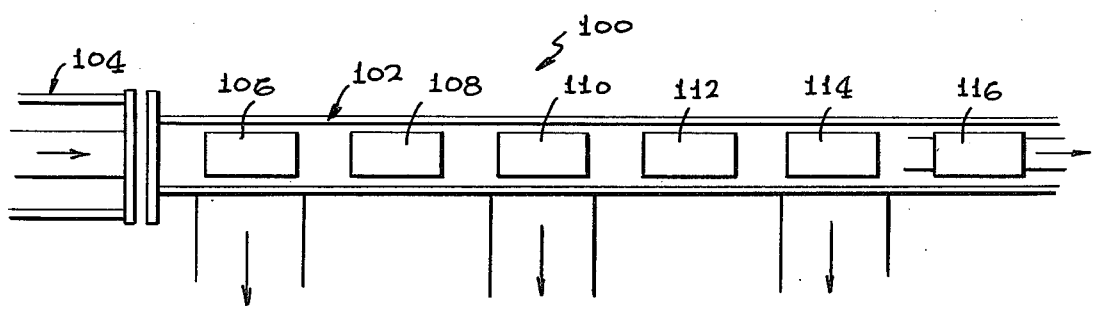
FIG. 8 is a schematic plan view of the second preferred embodiment of the apparatus for individual bag-working and stacking in accordance with this invention, and for operating in accordance with the method thereof.

The second preferred embodiment of the apparatus for individual bag-working and stacking is schematically shown in FIG. 8. Apparatus 100 comprises vacuum conveyor 102 which receives bags from bag-making machine 104. The bag-making machine 104 is the same as bag-making machine 12, and vacuum conveyor 102 has the same kinds of elements as the apparatus 10 described above. However, rather than only two stations, the vacuum conveyor 102 has a plurality of stations. The first station is work station 106 which is followed by second station 108 in the form of a rest station where vacuum is continuously applied to the vacuum conveyor. Third station 110 is again a work station and is followed by fourth station 112 in the form of a rest station. Both fifth station 114 and sixth station 116 are work stations. As the bags are cyclically advanced along vacuum conveyor 102, with an advance of slightly more than a bag length and thereupon a dwell, preprogramming determines to which work station bags will be delivered. The work stations 106, 110, 114 and 116 can have various types of work accomplished in connection therewith. For example, any of these stations can accomplish printing, cutting, stacking, handle attachment, wicketing, installation and sealing in of drawstrings, together with the delivery after the secondary operations are performed. The apparatus 100 can be arranged so that, for a selected part of the run, all bags are worked on at a particular work station; and, in a different part of the bag run, all those bags are subjected to a different kind of postwork. In this way, smaller bag runs are economical, with all of the possible postwork stations set up and selectively employed. At each work station, a secondary conveyor carries away the bag after it has been worked on to subsequent packaging or bag-filling. In each case, vacuum is released at the work station where the work is to be accomplished, and the bag has been advanced to that station by maintenance of vacuum to that point. Thereupon, the vacuum is released at the selected work station, the bag is engaged with a plunger and delivered to the work station. For this reason, each of the stations has its own section along the length of the vacuum conveyor rail and the vacuum at each station is controlled so that release of the bag and plungering down of the bag is accomplished at the station where working is desired.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. An apparatus for polymer bag handling comprising:
   a single vacuum conveyor having first and second stations, said vacuum conveyor having an upwardly directed active surface and being positioned to receive polymer film bags on the top of said active surface from a bag-making machine;
   means for connection to the bag-making machine for intermittently advancing said vacuum conveyor to receive bags as intermittently received from the bag-making machine so that bags carried thereon are intermittently advanced onto said first station from the bag-making machine and intermittently advanced on said single vacuum conveyor from said first station to said second station; and
   means for maintaining vacuum on said vacuum conveyor at said first station and for terminating the application of vacuum to said second station when said vacuum conveyor is stationary.

2. The apparatus of claim 1 wherein said apparatus has a fixed frame and has cross bars extending across said fixed frame in a direction transverse to the direction of motion of said vacuum conveyor, said vacuum conveyor comprising first and second spaced rails adjustably mounted on said cross bars so that said rails can be positioned a selected distance from each other.

3. An apparatus for polymer bag handling comprising:
   a single vacuum conveyor having first and second stations, said vacuum conveyor being positioned to receive polymer film bags from a bag-making machine; said vacuum conveyor having spaced vacuum conveyor rails each comprising a tube having an active surface and each having openings from the interior thereof through said active surface, a conveyor belt extending along the length of each of said tubular conveyor rails and lying against said active surface thereof, each of said belts having vacuum-transmitting openings therethrough, a vacuum connection to each of said rails so that vacuum can be applied thereto, so that vacuum is communicated from the interior of said tubular rails through said active surface openings and through said belt to hold polymer film bags onto said belts as long as vacuum is applied;
   means for intermittently advancing said vacuum conveyor to receive bags as intermittently received from the bag-making machine so that bags carried thereon are intermittently advanced onto said first station from the bag-making machine and intermittently advanced on said single machine conveyor from said first station to said second station;
   means for maintaining vacuum on said vacuum conveyor at said first station and for terminating the application of vacuum on said vacuum conveyor at said second station when said vacuum conveyor is stationary;
   means positioned adjacent said second station for acting on a bag positioned at said second station, said means for acting on a bag at said second station being controlled so that it acts upon a bag at said second station only when said conveyor is stationary and vacuum is released at said second station.

4. The apparatus of claim 3 wherein said vacuum conveyor rails each have their tubular interior closed off by a divider to define the first and second stations along said vacuum conveyor, separate vacuum connections to each of said vacuum conveyor rail sections, with the vacuum connections on one of said sections being connected to a vacuum source and the vacuum connections on the other of said sections being connected to a vacuum control valve so that, when said vacuum control valve is turned off, vacuum is absent from the other of said sections.

5. The apparatus of claim 4 wherein there is a work station associated with the other of said sections and a plunger is positioned adjacent the other of said sections, said plunger being connected to said vacuum valve and to said conveyor drive means so that, when a polymer bag is advanced to said other of said sections, said vacuum valve can be selectively turned off and said plunger actuated to move the polymer film bag being from the conveyor at said other section to an adjacent work station.

6. The apparatus of claim 5 wherein said apparatus has a fixed frame and has cross bars extending across said fixed frame in a direction transverse to the direction of motion of said vacuum conveyor, said vacuum conveyor comprising first and second spaced rails adjustably mounted on said cross bars so that said rails can be positioned a selected distance from each other.

7. An apparatus for polymer film bag handling comprising:
   a single vacuum conveyor having first and second stations, said vacuum conveyor having first and second spaced and substantially parallel vacuum rails extending from said first station to said second station, each of said rails being tubular and having a perforated conveyor belt passing thereacross, each of said rails being perforated on the side toward its conveyor belt, the interior of said tubular rails being separated between said first and second stations;
   means to intermittently advance and stop said conveyor belts past said first and second stations;
   means to apply vacuum to said vacuum conveyor at said first station;
   means for selectively applying vacuum to said vacuum conveyor at said second station and to terminate vacuum to said second station when said belts are stationary; and
   means for selectively removing polymer film bags from said vacuum conveyor at said second station, said means for removing being connected to said vacuum applying means so that said means for removing is actuated to remove polymer film bags from said second station of said vacuum conveyor only when said conveyor is stationary and vacuum is terminated to said vacuum conveyor at said second station.

8. The apparatus of claim 7 wherein said apparatus has a fixed frame and has cross bars extending across said fixed frame in a direction transverse to the direction of motion of said vacuum conveyor, said vacuum conveyor rails being adjustably mounted on said cross bars so that said rails can be positioned a selected lateral distance from each other.

9. An apparatus for polymer film bag handling comprising:

a single vacuum conveyor for receiving polymer film bags from a bag-making machine, said vacuum conveyor having a plurality of stations along the length thereof, each of said stations being separately connectable to a vacuum source, at least one of said stations being a bag-handling station and another of said stations being for retaining and advancing a polymer film bag, intermittent drive means connected to said vacuum conveyor for advancing said conveyor from station to station and stopping between advances;

means for connecting said another of said stations to a source of vacuum and means for connecting said at least one of said stations to a vacuum control valve so that vacuum can be selectively applied to said at least one of said stations; and a bag-handling device adjacent said conveyor at said one of said stations, means to actuate said bag-handling device, said means to actuate being connected to said vacuum valve and to said intermittent conveyor drive means so that said means to actuate is only actuated when said conveyor is stopped and vacuum is turned off at said one station.

10. The apparatus of claim 9 wherein there are a plurality of said one stations of a plurality of bag-handling devices, each of said bag-handling devices positioned adjacent one of said one stations.

11. The method of handling polymer film bags comprising the steps of:

intermittently advancing and stopping a single vacuum conveyor positioned adjacent the delivery of a polymer film bag-making machine, with the conveyor advancing as a bag is being received, and with intermittent advance of the conveyor moving the bag to a first station at which it stops and then to a second station at which it stops;

maintaining vacuum on the conveyor at the first station even when the conveyor is stopped;

selectively terminating vacuum to the conveyor at the second station when a bag is to be handled at the second station and when the conveyor is stationary, between the intermittent advances of the conveyor; and acting on the bag at the second station when the vacuum is turned off at the second station and the conveyor is stationary.

12. The method of claim 11 wherein there are a plurality of bag-handling stations and the method also includes the selective control of the vacuum at each of the bag-handling stations together with selective control of the bag handling at the bag-handling station so that the vacuum is selectively turned off and the bag handling at the station is selectively actuated in accordance with the desire for particular bag handling.

* * * * *